Patented July 10, 1951

UNITED STATES PATENT OFFICE 2,560,028

NONDISCOLORING ANTIOXIDANTS FOR NATURAL RUBBER AND SYNTHETIC RUBBERS

Leland J. Kitchen and Joseph C. Ambelang, Akron, Ohio, assignors to The Firestone Tire & Rubber Company, Akron, Ohio, a corporation of Ohio No Drawing. Application August 6, 1947, Serial No. 766,872

14 Claims. (Cl. 260—45.95)

This invention relates to the stabilization of natural rubber and synthetic rubber by incorporation therein of a 2-alkyl-4-methylphenol in which the alkyl group contains seven or more carbon atoms up to, for example, twenty.

It has been found that the 4-methylphenols substituted in the 2-position by an alkyl group of one, two or three carbon atoms is not a good stabilizer. However, the 4-methylphenols substituted in the 2-position with alkyl groups containing seven or more carbon atoms, and particularly the octyl-substituted compounds and especially 2-tt-octyl-4-methylphenol, are good stabilizers and particularly valuable because they are nondiscoloring. Phenyl-beta-naphthylamine which is widely used commercially as a stabilizer, is known to be objectionable because it discolors white and other light-colored stocks, such as the stocks used for the white side walls of tires and light-colored mechanical goods, etc. The stabilizers of this invention have comparable stabilizing effect and are superior in that they do not discolor. They retard and inhibit oxidative deterioration of natural rubber vulcanizate and retard and inhibit oxidative deterioration of both cured and uncured synthetic rubbers. When used with synthetic rubbers, they are advantageously added to the latex, particularly if the latex is obtained by emulsion copolymerization; and, thus, they are effective in retarding decomposition during the drying of the latex as well as in subsequent treatments of the uncured copolymer and in the preparation and use of the vulcanizate.

The 2-alkyl-4-methylphenols which may be used in practicing the invention include particularly 2-tt-octyl-4-methyl-phenol (prepared by alkylating p-cresol with diisobutylene) and 2-sec-octyl-4-methylphenol (prepared by alkylating p-cresol with 1-octene). The 2-alkyl substituent is large, containing at least seven carbon atoms and includes both cycloaliphatic and aliphatic groups, such as, for example, the various heptyl, octyl, nonyl, etc., groups including aliphatic groups containing up to twenty carbon atoms and p-methylcyclohexyl, etc., including the cycloaliphatic groups up to and including those containing twenty carbon atoms. The 2-alkyl substituent is large, containing at least 7 carbon atoms and includes both cyclic alkyl and open-chain alkyl radicals, such as, for example, the various heptyl, octyl, nonyl, etc. radicals including alkyl groups containing up to 20 carbon atoms, and alkyl-substituted cyclic alkyl radicals, including p-methylcyclohexyl, etc.

STABILIZATION OF NATURAL RUBBER

In the stabilization of natural rubber the invention finds particular importance in the preparation of white side walls for pneumatic tires. The stabilizers inhibit or retard weather checking and flex cracking without substantial discoloration or staining even on aging.

The stabilizers may be incorporated in the rubber by milling or Banbury mixing, or they may be emulsified and the emulsions added to the rubber latex before coagulation. The following example is illustrative:

Natural rubber stock was compounded according to the following formula, all parts being by weight:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 2-tt-octyl-4-methylphenol | 1 |
| Benzothiazyl disulfide | 0.4 |
| Amine activator | 0.5 |

A control was obtained by milling stock according to the same formula but omitting the 2-tt-octyl-4-methylphenol. The two stocks were vulcanized 20, 40 and 60 minutes at 280° F. Tapered strips stretched to 12½ per cent elongation were exposed to Florida sunlight, both direct and indirect, for two months to determine to what extent the test stock would be discolored. In the tests neither the test stock nor the control underwent discoloration. Similar stocks containing antioxidants of the aromatic amine type discolored. For example, phenyl-beta-naphthylamine rendered the vulcanizate tan during the sunlight exposure test.

In another test for discoloration the test stock and control were exposed in a weatherometer for four hours. Both the test and control stocks remained white during the test.

The stocks were then tested to note the effect of the stabilizer on their flex life. One-half inch dumbbell strips were flexed with 0 to 75 per cent elongation until all strips were broken. The flex life was noted, and the cracks were counted to give the value recorded in the last column of the following table. The values in the table are averages of those obtained on 20, 40 and 60 minute cures.

TABLE I

*Natural rubber flex life*

| Stabilizer | Flex Life | | Rate of crack Formation, Cracks/hour |
|---|---|---|---|
| | Hours | Per Cent Improvement | |
| 2-tt-octyl-4-methylphenol | 49.72 | 37 | 2.3 |
| None (control) | 35.42 | | 3.8 |

In another test, strips of the stocks were exposed to a sunlamp for thirty-six hours to determine the effect of the stabilizer on weather checking. The strips of the test stock showed less checking (formation of a network of surface cracks) than the controls which contained no stabilizer.

STABILIZATION OF BUTADIENE-ACRYLONITRILE COPOLYMER

Tests were conducted to determine the effect of the stabilizers in rubber-like copolymers of the type obtained from a conjugated diene and a monomer having the formula $CH_2=C(R)-X$ when R is hydrogen, methyl, ethyl, propyl or chlorine and X is —CN, —$CONH_2$, —COR' or —COOR' when R' contains one to five carbon atoms. In the first series of tests the copolymer used was produced from 1,3-butadiene and 32 per cent acrylonitrile. The stabilizer was 2-tt-octyl-4-methylphenol and was added as an emulsion in sodium oleate solution to the latex obtained from emulsion copolymerization of the monomers. The latex was coagulated with a pure grade of aluminum sulfate. The coagulum, after washing on a wash mill, was dried for twenty hours at 70° C.

The above dried copolymer prepared from latex containing 2 per cent (based on the dry weight of the copolymer) of the stabilizer was compared with copolymer identically obtained but to which 2 per cent phenyl-beta-naphthylamine had been added instead of the stabilizer of this invention. The control thus produced was light lavender-brown after drying; whereas the test material was white. A third sample of copolymer, identically prepared, using a like amount of sodium oleate but no stabilizer, was light tan in color and partially resinified on the surface after drying. Thus, drying in the absence of stabilizer causes deterioration, and the stabilizers of this invention prevent such deterioration when used for drying at any elevated temperature.

The following table shows the results of aging copolymer in a circulating air oven maintained at 95° C. Samples of 180 grams and 225 square centimeters in area were tested. The aging was conducted for ten days. After such aging, the properties of the two samples were as represented in the following table:

TABLE II

*Butadiene-acrylonitrile copolymer aging*

| Antioxidant Present | Color of Copolymer | Condition of Copolymer |
|---|---|---|
| 2-tt-octyl-4-methylphenol | light tan | very good. |
| phenyl-beta-naphthylamine (control) | dark brown | Do. | to set up more rapidly, the condition or set up after aging is an indication of antioxidant activity. In tests, this set up was measured by determining the time required to reverse the cured condition by milling, as follows: The cold (water cooled) rolls (6-inch diameter) of a mill were set at a clearance of 0.005 inch. A 200-gram sheet of aged copolymer was folded twice and passed once through the rolls. It was then milled until the sheet on the roller contained no holes. The time in seconds, exclusive of the initial pass, required to bring the sheet to this condition is recorded in the following table:

TABLE III

*Copolymer set up*

| Antioxidant Present | Time in Seconds |
|---|---|
| 2-tt-octyl-4-methylphenol | 16 |
| phenyl-beta-naphthylamine | 14 |
| 3-methyl-4,6-di-tert-butylphenol | 20 |
| p-tert-octylphenol | 28 |

Thus, the 2-tt-octyl-4-methylphenol, which is the only one of the above compounds which comes within the scope of this invention, was practically the equivalent of phenyl-beta-naphthylamine in inhibiting set up of the copolymer during heat-aging. The results obtained with the other two alkylated phenols recorded in the above table indicate that alkylation other than alkylation of a para-cresol in the 2-position can result in marked lessening of the antioxidant effectiveness. 3-methyl-4,6-di-tert-butylphenol was used because it has the same molecular weight as the test material, and the p-tert-octylphenol was used because it contains an octyl group. It is evident that the latter two samples of the above table underwent a greater degree of set up than the test and control samples.

Both the unaged and the aged copolymers containing 2-tt-octyl-4-methylphenol and phenyl-beta-naphthylamine (control) were compounded in carbon black stocks according to the following formula:

| | Parts |
|---|---|
| Copolymer+2% stabilizer | 100 |
| Stearic acid | 3.5 |
| Zinc oxide | 5 |
| Carbon black | 40 |
| Sulfur | 2 |
| Accelerator | 1.3 |

The accelerator used was N-cyclohexyl-2-benzothiazyl sulfenamide.

The stocks were vulcanized sixty minutes at 274° F. The physical properties of the cured stocks are recorded in the following table:

TABLE IV

*Physical properties of vulcanizate*

| Aging Treatment of Copolymer | Stabilizer Present | Tensile at 300% Elongation | Tensile at Break | Elongation at Break |
|---|---|---|---|---|
| | | P.s.i. | P.s.i. | Per cent |
| None | 2-tt-octyl-4-methylphenol | 675 | 2,575 | 600 |
| Do | phenyl-beta-naphthylamine | 625 | 2,825 | 700 |
| 10 days at 95° C | 2-tt-octyl-4-methylphenol | 875 | 3,500 | 670 |
| Do | phenyl-beta-naphthylamine | 850 | 3,575 | 700 |

A phenomenon encountered with butadiene-derived synthetic rubbers which precedes deterioration, during aging, is a "set up" or condition of mild cure caused by cross-link formation between polymer chains. Since this set up precedes deterioration and the less stable polymers tend The stabilizer of this invention likewise was effective in imparting age-resistance to a vlucanizate prepared from a butadiene-acrylonitrile copolymer. A vulcanizate stabilized with 2-tt-octyl-4-methylphenol was subjected to air-bomb aging—air at 60 p.s.i. for ten hours at 250° F.

Physical properties of the vulcanizate are recorded in the following table.

TABLE V

*Bomb aging of vulcanizate*

|  | Before Aging | After Bomb Aging |
|---|---|---|
| Tensile at 300% elongation (p. s. i.) | 1,075 | 1,800 |
| Tensile strength (p. s. i.) | 3,550 | 3,525 |
| Per Cent elongation at break | 620 | 440 |

The aged vulcanizate was of good quality.

STABILIZATION OF BUTADIENE-STYRENE COPOLYMER

The stabilizers have been found to be effective and non-discoloring when used in a copolymer of a conjugated diene and an aromatic vinyl compound. For instance, 2 per cent of 2-tt-octyl-4-methylphenol emulsified in sodium oleate was added to a rubber-like copolymer of 1,3-butadiene and styrene containing 25 per cent of combined styrene. A control was prepared in which phenyl-beta-naphthylamine was similarly used. On drying, the test material remained white in color; whereas the control turned brown.

The test sample and control were then further tested against a blank which contained no stabilizer and a fourth sample which contained a trialkylated phenol. These four samples were aged by placing them in a circulating air oven where they were kept at 110° C. for two days. The following table records the results:

TABLE VI

*Copolymer aging*

| Antioxidant Present | Quality and Color of Aged Copolymer |
|---|---|
| Test material | Good; medium brown. |
| Control | Very good; dark brown. |
| Blank | Very poor; medium brown. |
| 3-methyl-4,6-di-tert-butylphenol | Poor; medium brown. |

In the second column of the table a rating of poor indicates deterioration had set in, as evidenced by stiffening and resinification of the sample. Thus, it is evident that the 2-tt-octyl-4-methylphenol is an effective antioxidant for such copolymer, providing considerably better protection than the trialkylated phenol of the same molecular weight.

Thus, the stabilizers of this invention are effective in natural rubber and synthetic rubbers. They may be used in the stabilization of other rubbers than those mentioned, such as polymers of isoprene, 1,3-butadiene and substituted 1,3-butadienes, such as chloroprene. They may be used in copolymers prepared with 1,3-butadiene, such as copolymers of 1,3-butadiene and other conjugated dienes with a vinyl aromatic compound, such as, for example, styrene, alpha-methyl-styrene, nuclear-substituted styrenes, monochlorostyrene, dichlorostyrene, vinylnaphthalene, vinylbiphenyl, vinylcarbazole, 2-vinyl-5-ethylpyridine, 2-ethyl-5-vinylpyridine, etc. The conjugated dienes which may be employed to produce rubber-like copolymers include, as is well-known, for example, 1,3-butadiene, isoprene, 2-cyano-1,3-butadiene, cyclopentadiene, piperylene, dimethylbutadiene, 2-methyl-1,3-pentadiene, etc. Thus, the stabilizers are effective in rubber-like synthetics produced by polymerization of unsaturated monomeric units, including butadiene polymerizates.

What we claim is:

1. Uncured, rubber copolymer of butadiene and acrylonitrile stabilized with a small amout of 2-tt-octyl-4-methylphenol.

2. Cured, natural rubber stabilized with a small amount of 2-tt-octyl-4-methylphenol.

3. Cured, rubber copolymer of butadiene and acrylonitrile stabilized with a small amount of 2-tt-octyl-4-methylphenol.

4. The method of preparing rubber copolymer of butadiene and acrylonitrile which comprises mixing with a latex thereof a small amount of 2-tt-octyl-4-methylphenol, as stabilizer, coagulating, and drying the coagulum at an elevated temperature.

5. The method of curing natural rubber which comprises heating it while it has mixed therewith sulfur and, as stabilizer, a small amount of 2-tt-octyl-4-methylphenol.

6. The method of curing rubber copolymer of butadiene and acrylonitrile which comprises heating it while it has mixed therewith sulfur and, as stabilizer, a small amount of 2-tt-octyl-4-methylphenol.

7. A composition containing rubber material from the group consisting of natural rubber and rubber copolymer of butadiene and acrylonitrile, said material being stabilized with a small amount of a 2-octyl-4-methylphenol.

8. The method of curing a rubber material from the group consisting of natural rubber and copolymer of butadiene and acrylonitrile, which comprises heating the same while it has mixed therewith sulfur, and a small amount of a 2-octyl-4-methylphenol.

9. Uncured, rubber copolymer of butadiene and acrylonitrile stabilized with a small amount of a 2-octyl-4-methylphenol.

10. Cured, rubber copolymer of butadiene and acrylonitrile stabilized with a small amount of a 2-octyl-4-methylphenol.

11. Cured, natural rubber stabilized with a small amount of a 2-octyl-4-methylphenol.

12. The method of curing natural rubber which comprises heating it while it has mixed therewith sulfur and, as stabilizer, a small amount of 2-octyl-4-methylphenol.

13. The method of curing rubber copolymer of butadiene and acrylonitrile which comprises heating it while it has mixed therewith sulfur and, as stabilizer, a small amount of a 2-octyl-4-methylphenol.

14. The method of preparing rubber copolymer of butadiene and acrylonitrile which comprises mixing with a latex thereof a small amount of a 2-octyl-4-methylphenol, as stabilizer, coagulating, and drying the coagulum at an elevated temperature.

LELAND J. KITCHEN.
JOSEPH C. AMBELANG.

REFERENCES CITED

The following references are of record in the file of this patent:

UNITED STATES PATENTS

| Number | Name | Date |
|---|---|---|
| Re. 20,337 | Stein | Apr. 20, 1937 |
| 2,335,089 | Sibley | Nov. 23, 1943 |
| 2,351,347 | Luten | June 13, 1944 |
| 2,356,929 | Hart | Aug. 29, 1944 |
| 2,370,756 | Sibley | Mar. 6, 1945 |
| 2,471,887 | Nelson | May 31, 1949 |